United States Patent
Taylor et al.

(10) Patent No.: US 9,781,361 B2
(45) Date of Patent: Oct. 3, 2017

(54) INTEGRATED CAMERA, AMBIENT LIGHT DETECTION, AND RAIN SENSOR ASSEMBLY

(71) Applicant: Delphi Technologies, Inc., Troy, MI (US)

(72) Inventors: Ronald M. Taylor, Greentown, IN (US); Dennis P. Griffin, Noblesville, IN (US)

(73) Assignee: DELPHI TECHNOLOGIES, INC., Troy, MI (US)

(*) Notice: Subject to any disclaimer, the term of this patent is extended or adjusted under 35 U.S.C. 154(b) by 219 days.

(21) Appl. No.: 14/842,392

(22) Filed: Sep. 1, 2015

(65) Prior Publication Data

US 2017/0064221 A1    Mar. 2, 2017

(51) Int. Cl.
  *H04N 5/33*     (2006.01)
  *B60S 1/08*     (2006.01)
  *H04N 5/235*    (2006.01)
  *H04N 5/225*    (2006.01)
  *H04N 9/04*     (2006.01)
  *H04N 5/369*    (2011.01)

(52) U.S. Cl.
  CPC ............ *H04N 5/332* (2013.01); *B60S 1/0844* (2013.01); *H04N 5/2257* (2013.01); *H04N 5/235* (2013.01); *H04N 5/3696* (2013.01); *H04N 9/045* (2013.01); *B60R 2300/108* (2013.01)

(58) Field of Classification Search
  None
  See application file for complete search history.

(56) References Cited

U.S. PATENT DOCUMENTS

| | | | |
|---|---|---|---|
| 6,452,148 B1 | 9/2002 | Bendicks et al. | |
| 2007/0247611 A1* | 10/2007 | Tamaki | B60R 1/00 |
| | | | 356/3.11 |
| 2015/0144770 A1 | 5/2015 | Choi, II | |
| 2015/0321644 A1* | 11/2015 | Kosubek | B60S 1/0844 |
| | | | 348/148 |

FOREIGN PATENT DOCUMENTS

| | | |
|---|---|---|
| EP | 1 580 092 A2 | 9/2005 |
| EP | 1 777 943 A1 | 4/2007 |
| GB | 2474557 A | 4/2011 |

* cited by examiner

*Primary Examiner* — Andy Rao
*Assistant Examiner* — Tyler Edwards
(74) *Attorney, Agent, or Firm* — Lawrence D. Hazelton

(57) ABSTRACT

An integrated camera, ambient light detection, and rain sensor assembly suitable for installation behind a windshield of a driver operated vehicle or an automated vehicle includes an imager-device. The imager-device is formed of an array of pixels configured to define a central-portion and a periphery-portion of the imager-device. Each pixel of the array of pixels includes a plurality of sub-pixels. Each pixel in the central-portion is equipped with a red/visible/visible/visible filter (RVVV filter) arranged such that each pixel in the central-portion includes a red sub-pixel and three visible-light sub-pixels. Each pixel in the periphery-portion is equipped with a red/green/blue/near-infrared filter (RGBN filter) arranged such that each pixel in the periphery-portion includes a red sub-pixel, a green sub-pixel, a blue sub-pixel, and a near-infrared sub-pixel.

5 Claims, 4 Drawing Sheets

| OVERSCAN POSITION | PRISM ROTATION ANGLE (°) |
|---|---|
| TM1 | 16.0 |
| TM2 | 19.5 |
| TE1=SE1 | 28.0 |
| TE2=SE2 | 33.0 |
| SM1 | 22.5 |
| SM2 | 26.0 |

INTEGRATED CAMERA, AMBIENT LIGHT DETECTION, AND RAIN SENSOR ASSEMBLY

TECHNICAL FIELD OF INVENTION

This disclosure generally relates to an integrated camera, ambient light detection, and rain sensor assembly, and more particularly relates to an imager-device with a central-portion equipped with a red/visible/visible/visible (RVVV) filter, a periphery-portion equipped with a red/green/blue/near-infrared (RGBN) filter, and optionally a plurality of catadioptric-elements configured to direct light onto the periphery-portion.

BACKGROUND OF INVENTION

It is known to provide a camera on a vehicle to detect objects proximate to (e.g. forward of) the vehicle. It is advantageous to mount the camera in the interior of the vehicle between the rear-view mirror and the windshield, i.e. behind the windshield. This location is advantageous as it provides for an elevated perspective of the roadway forward of the vehicle, does not further obscure the operator's vision as this location is already obscured by the rear-view mirror, makes use of the windshield to protect the camera, and allows for the windshield-wipers to be configured to keep clean the portion of the windshield that the camera 'looks' through.

It is also advantageous to locate a rain sensor at this location for the same reasons with regard to obscuring the operator's vision. The rain sensor may be used by the vehicle to automatically operate the windshield wipers to both give the operator a clear view of the roadway, and keep clear the camera's field-of-view. However, prior attempts of locating both a camera and a rain sensor at the same location, possibly in combination with other devices such as a radar unit and/or an ambient light sensor, have resulted in a combined module package size that is cumbersome to mount and extends beyond the area already obscured by the rear-view mirror, thereby undesirably further obscuring the operator's view of the roadway.

SUMMARY OF THE INVENTION

Described herein is an assembly that combines an integrated camera, ambient light detection, and rain sensor. The assembly overcomes the problems described above. One aspect of the assembly is that otherwise unused pixels in a periphery-portion of an imaging-device (e.g. an integrated circuit) of the camera is used for detection of water (e.g. raindrops) on a windshield of a vehicle and determining an ambient-light-intensity, while a central-portion of the imaging-device is used to captures images. The configuration of the assembly described herein minimizes the package requirements for a combined camera, rain sensor, and ambient light sensor. In an alternative embodiment a catadioptric prismatic type ring-lens is mounted on the existing forward looking camera main-lens. The optical design of this embodiment allows the main-lens to cooperate with the auxiliary catadioptric prismatic ring-lens to focus light over a wide field of view for the ambient light collection. The configuration also allows for infrared or near-infrared LEDS to be placed close to the windshield surface for high signal reflection and thereby minimize LED power/cost requirements for rain sensing.

Pixels that form the imager-device are individually filtered and segregated with a custom imager spectral filter mask. This configuration advantageously enables the camera function to utilize the normal visible RVVV (red, visible ×3) spectral filter over a central-portion of the imager-device, while a periphery-portion is equipped with a RGBN (red, green, blue, and near-infrared) to enable rain sensing via the near-infrared filter (blocks visible light and eliminates noise) and enable ambient light sensing via the visible RGB (red-green-blue) spectral filter to match the human eye spectrum. Further advantages are: the integration of a camera with a rain sensor; optics integrated but independent of the main-lens structure (e.g. traditional, reflowable, etc.); lower cost than traditional optical sensors; more flexible than common rain sensor using camera image processing algorithms; larger detection area (3-5× optical sensor); no enduring false detections due to dirt/bugs/salt leftovers as dirt is memorized and subtracted with negligible loss of detection area.

In accordance with one embodiment, an integrated camera, ambient light detection, and rain sensor assembly suitable for installation behind a windshield of a vehicle is provided. The assembly includes an imager-device formed of an array of pixels configured to define a central-portion and a periphery-portion of the imager-device. Each pixel of the array of pixels includes a plurality of sub-pixels. Each pixel in the central-portion is equipped with a red/visible/visible/visible filter (RVVV filter) arranged such that each pixel in the central-portion includes a red sub-pixel and three visible-light sub-pixels. Each pixel in the periphery-portion is equipped with a red/green/blue/near-infrared filter (RGBN filter) arranged such that each pixel in the periphery-portion includes a red sub-pixel, a green sub-pixel, a blue sub-pixel, and a near-infrared sub-pixel.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
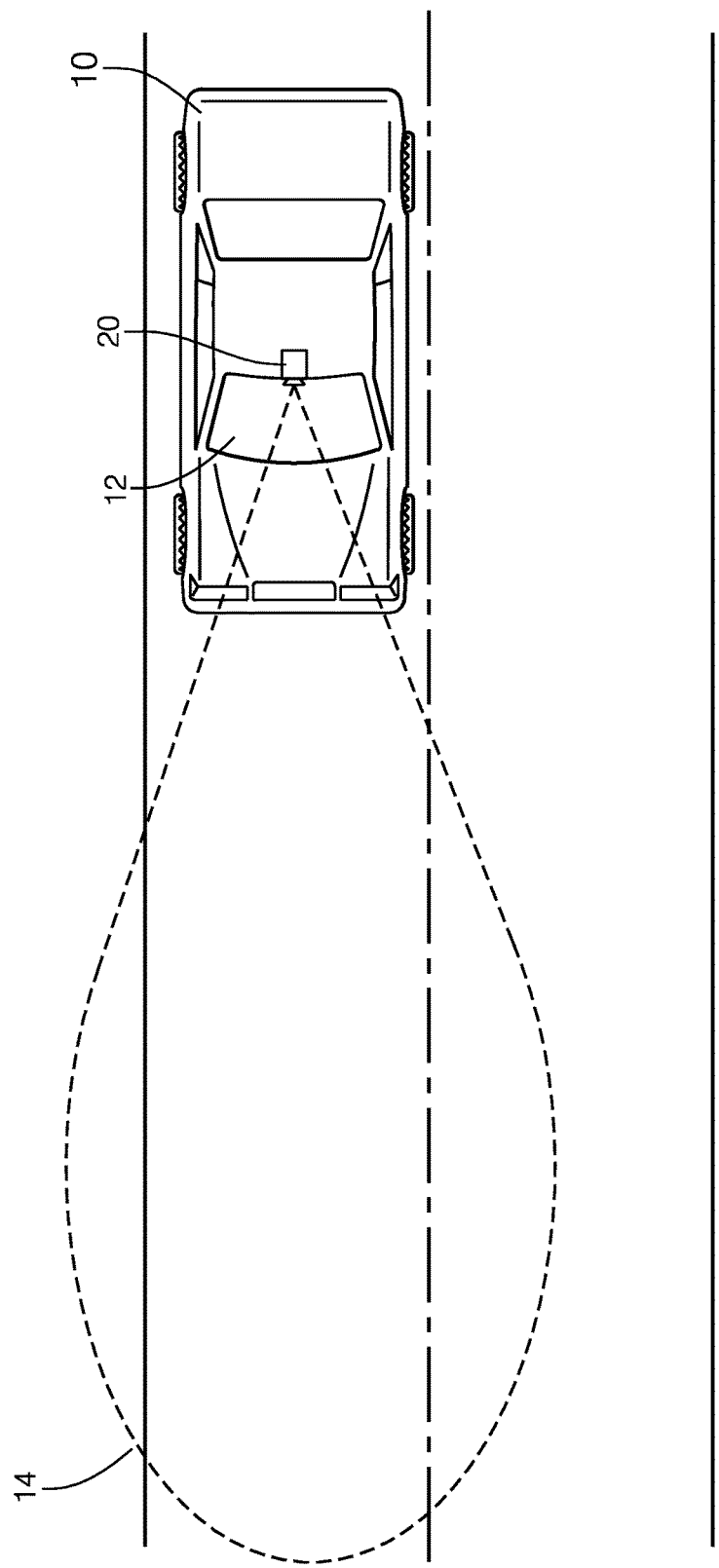
FIG. 1 is at top view of a vehicle equipped with an integrated camera, ambient light detection, and rain sensor assembly in accordance with one embodiment.

FIG. 1 illustrates a non-limiting example of an integrated camera, ambient light detection, and rain sensor assembly, hereafter referred to as the assembly 20, which is suitable for installation behind a windshield 12 (i.e. in the interior) of a vehicle 10. As will be described in more detail below, the assembly 20 is generally configured to determine an image 16 (FIG. 2) of a field-of-view 14 proximate to the vehicle 10. In this non-limiting example, the filed-of-view 14 is generally forward of the vehicle 10. The assembly 20 is also generally configured to determine an ambient-light-intensity 22 of ambient-light 18 outside of the vehicle 10, and determine a presence of water 24 (e.g. raindrops) on the windshield 12.

Figure 2:
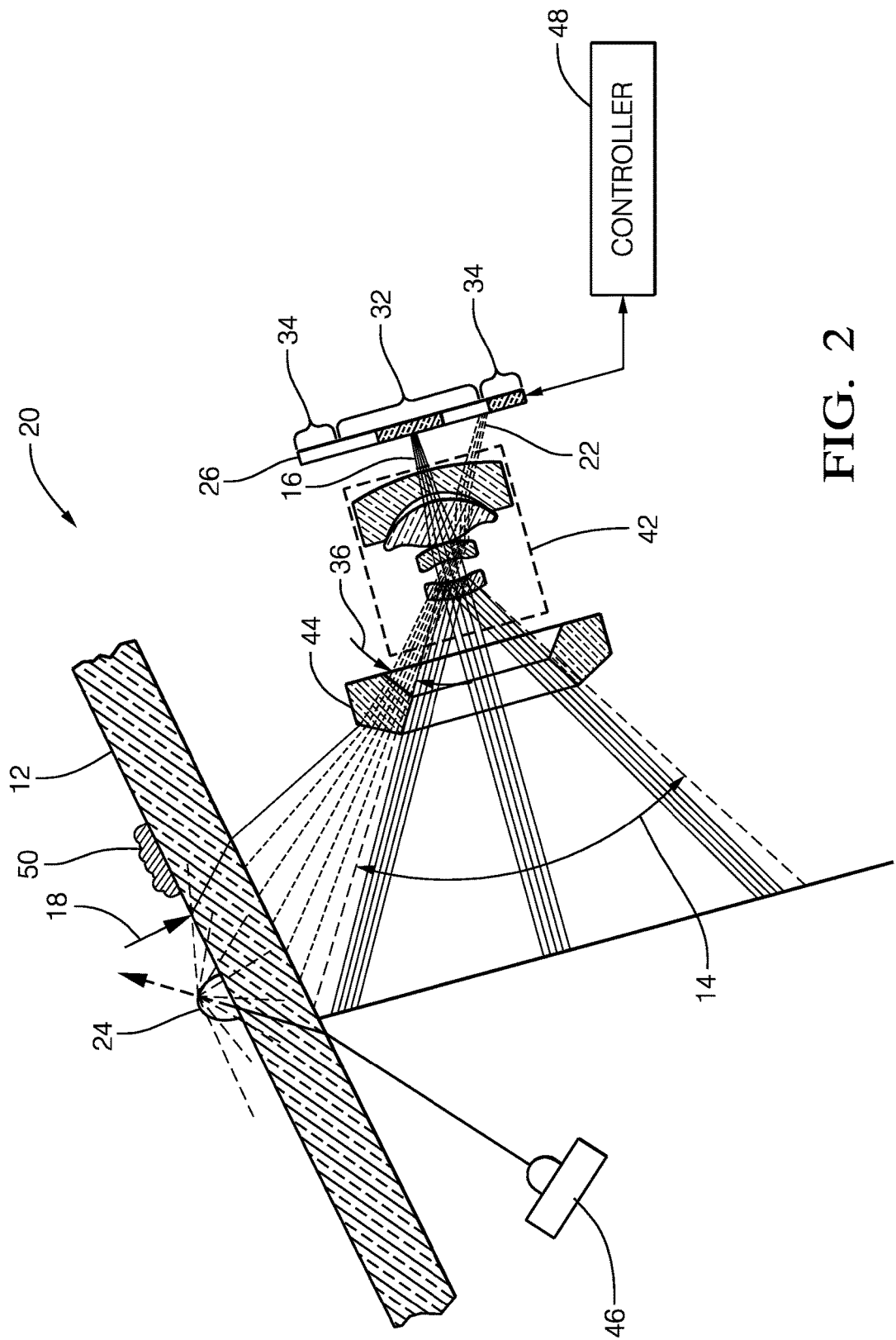
FIG. 2 is a cut-away side view of the assembly of FIG. 1 in accordance with one embodiment.
Figure 3:
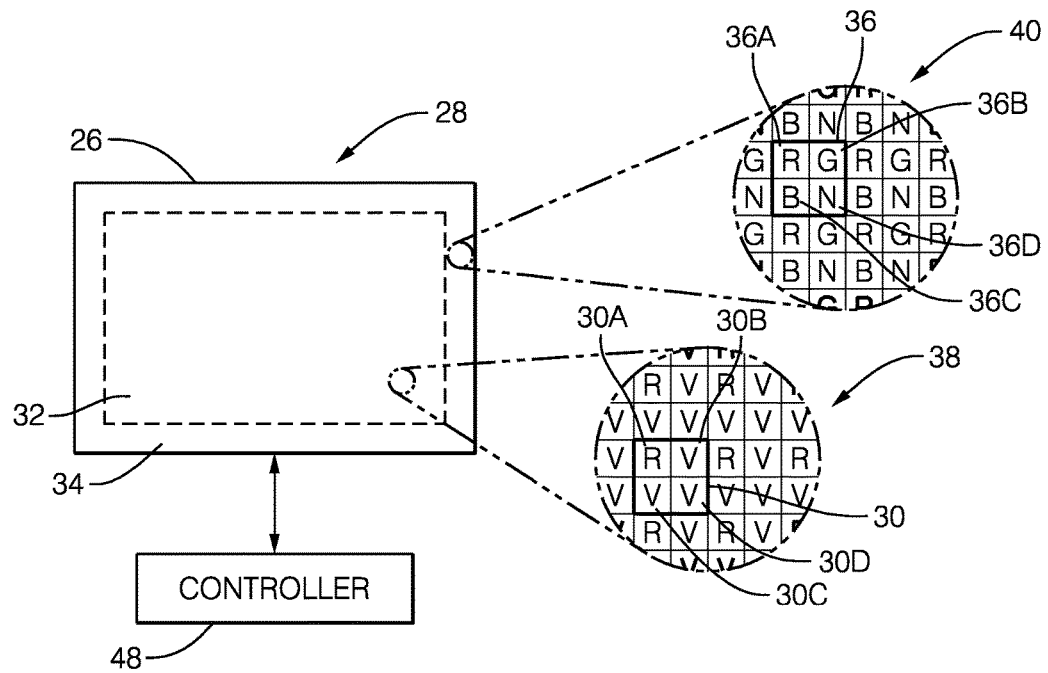
FIG. 3 is front view of an imager-device used in the assembly of FIG. 2 in accordance with one embodiment.

FIGS. 2 and 3 illustrate further non-limiting details of the assembly 20. The assembly 20 includes a single instance of an imager-device 26 (FIG. 2: edge view; FIG. 3: front view) which may be based on a commercially available CMOS image sensor. As will be recognized by those in the art, the imager-device 26 is formed of an array 28 of pixels, and each instance of a pixel (30, 36) includes a plurality of sub-pixels; four sub-pixels per pixel in this non-limiting example. By way of example and not limitation, the imager-device 26 may have 1280×960 pixels.

The imager-device 26 is distinct from prior examples of image sensors and the like as the imager-device 26 is uniquely configured to define a central-portion 32 and a periphery-portion 34 of the imager-device 26. Each instance of the pixel 30 in the central-portion 32 is equipped with a red/visible/visible/visible filter, hereafter the RVVV filter 38, that is arranged such that each instance of the pixel 30 in the central-portion 32 includes a red sub-pixel 30A and three visible-light sub-pixels 30B, 30C, 30D. In contrast to prior examples of imager-devices, each instance of the pixel 36 in the periphery-portion 34 is equipped with a red/green/blue/near-infrared filter, hereafter the RGBN filter 40 arranged such that each pixel in the periphery-portion 34 includes a red sub-pixel 36A, a green sub-pixel 36B, a blue sub-pixel 36C, and a near-infrared sub-pixel 36D.

As will be explained in more detail later, the RVVV filter 38 is well suited for the central-portion 32 to serve as a black-and-white type camera using the three visible-light sub-pixels 30B, 30C, 30D, while the red sub-pixel 30A allows the assembly 20 to be useful to distinguish the red tail-lights of other vehicles from the white headlights of other vehicles and other sources of non-red light such as street-lights. As will also be explained in more detail later, the RGBN filter 40 of the periphery-portion 34 allows for the near-infrared sub-pixel 36D to be used for detecting or sensing water (e.g. rain) on the windshield 12, while the red sub-pixel 36A, the green sub-pixel 36B, and the blue sub-pixel 36C cooperate to provide a means to determine the ambient-light-intensity 22 with a color detection balance that corresponds to a human eye so is advantageous for controlling vehicle instrument cluster brightness and other vehicle interior lighting/display functions.

Referring to FIG. 2, the assembly 20 may include a main-lens 42 configured to focus light from the field-of-view 14 onto the central-portion 32 of the imager-device 26. The configuration or design of the main-lens 42 is determined or selected based on a variety of known characteristics such as desired viewing angle (i.e. the angle of the field-of-view 14), focal-length, depth-of-field, aperture, etc., as will be recognized by those in the art. A suitable example of the main-lens 42 is the model 4067 from Sunny Optical Technology (Group) Company Limited, which has headquarters in Zhejiang, China.

The assembly 20 may also include a ring-lens 44 configured to capture light outside of the field-of-view 14, and direct that light through the main-lens 42 and onto the periphery-portion 34. It is not a requirement that the ring-lens 44 only capture light from outside of the field-of-view. That is, the ring-lens 44 may also be configured to capture light from within the field-of-view 14 in addition to, or as an alternative to, light from outside the field-of-view 14. FIG. 2 suggests that the ring-lens 44 only captures light from outside of the field-of-view only for the purpose of simplifying the illustration.

A light-source 46, such as an infrared light-emitting-diode (LED), may be provided to illuminate instances of water 24 on the windshield. If the near-infrared sub-pixel 36D in the periphery-portion 34 of the imager-device 26 detects near-infrared light that corresponds to what is being emitted by the light-source 46, then that may be an indication that the water 24 is present on the windshield 12. Preferably, the light-source 46 is part of the assembly 20 and close to the ring-lens 44 to minimize the amount of electrical-energy necessary to sufficiently illuminate the water 24. FIG. 2 shows the light-source 46 located spaced-apart from the ring-lens 44 only for the purpose of simplifying the illustration.

The assembly 20 may include a controller 48 in communication with the imager-device 26. The controller 48 may include a processor (not shown) such as a microprocessor or other control circuitry such as analog and/or digital control circuitry including an application specific integrated circuit (ASIC) for processing data/signals from the imager-device 26, as should be evident to those in the art. The controller 48 may include memory (not shown), including non-volatile memory, such as electrically erasable programmable read-only memory (EEPROM) for storing one or more routines, thresholds and captured data. The one or more routines may be executed by the processor to perform steps for determining if signals received by the controller 48 from the imager device 26 indicate that, for example, there are raindrops on the windshield 12, or an object such an other-vehicle (not shown) is present forward of the vehicle 10.

To this end, the controller 48 is generally configured to determine an image 16 of the field-of-view 14 forward of the vehicle 10 based on light detected by the red sub-pixel 30A and the three visible-light sub-pixels 30B, 30C, 30D of pixels in the central-portion 32. Signals from the three visible-light sub-pixels 30B, 30C, 30D can be combined to increase the low ambient light sensitivity of the camera function provided by the central portion 32. Signals from the red sub-pixel 30A can be compared to the signals from the three visible-light sub-pixels 30B, 30C, 30D to determine if a light in the field-of-view 14 is a red tail-light of a vehicle and thereby distinguish red tail-lights of other vehicles from headlights and other non-red lights. This ability to distinguish red tail-lights from other lights is useful for an operator assist system and an automated vehicle (i.e. autonomous vehicle) system to detect when an object forward of the vehicle 10 is an other-vehicle traveling in the same direction as the vehicle 10, and detect when that other-vehicle is braking which is indicated by an increase in light intensity emitted by the red tail-lights. As such, the controller 48 is configured to determine which pixels of the central-portion 32 detect red-taillights (not shown) of an other-vehicle (not shown) based on a comparison of light-intensity indicated by the red sub-pixel 30A to light-intensity indicated the three visible-light sub-pixels 30B, 30C, 30D of a selected pixel.

The controller 48 is also generally configured to determine an ambient-light-intensity 22 of the ambient-light 18 based on light detected by the red sub-pixel 36A, the green sub-pixel 36B, and the blue sub-pixel 36C of pixels in the periphery-portion 34. By determining the ambient-light-intensity 22 based on the intensity of red, green, and blue light, the ambient-light-intensity 22 can better correspond to what is perceived by a human-eye. For example, an ambient light detector that does not determine ambient light intensity by considering the intensity of three different colors may over-estimate ambient light intensity if large advertising signs illuminated by colored lights are detected by an ambient light detector that does not discriminate the different colors of light.

The controller 48 is also generally configured to determine a presence of water 24 on the windshield 12 based on light detected by the near-infrared sub-pixel 36D of pixels in the periphery-portion 34. It is advantageous to detect the water 24 by detecting infrared-light because the light-source 46 can be configured to emit infrared-light which avoids annoying or interfering with the vision of the operator of the vehicle 10.

Prior examples of rain-sensors that determine the presence of water on a windshield used a very few number of light detectors to detect infrared light scattered/reflected by the water 24 as illustrated in FIG. 2. By using the periphery-portion 34 of the imager-device 26 to detect the water 24, the controller 48 can be configured to determine which pixels of the periphery-portion 34 correspond to an enduring-obstruction 50 on the windshield 12, and ignore those pixels when the controller 48 determines the presence of water 24. As used herein, the term enduring-obstruction is used to indicate something on the windshield 12 detected by the imager-device 26 that is not removed by operating the windshield-wipers which would remove, for example, the water 24. Non-limiting examples of the enduring-obstruction 50 include, but are not limited to, dried bugs that splattered on the windshield, dirt, tar, and/or damage to the windshield 12 such as stone chip or crack in the glass that forms the windshield 12.

Figure 4:
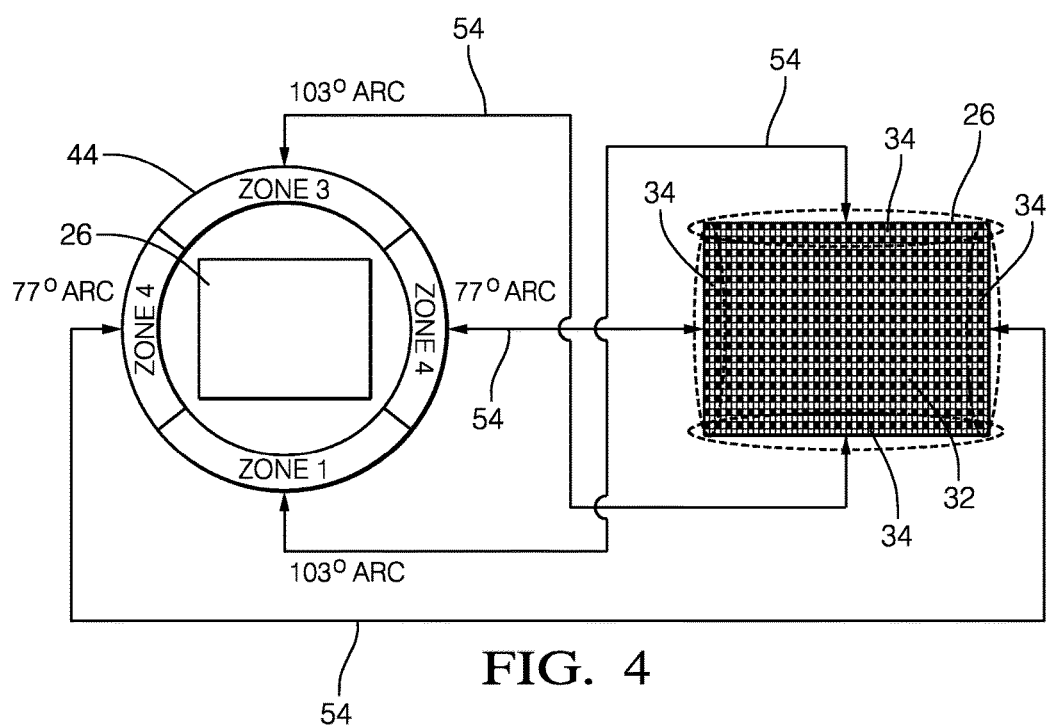
FIG. 4 is a diagram of part of the assembly of FIG. 2 in accordance with one embodiment.
Figure 5:
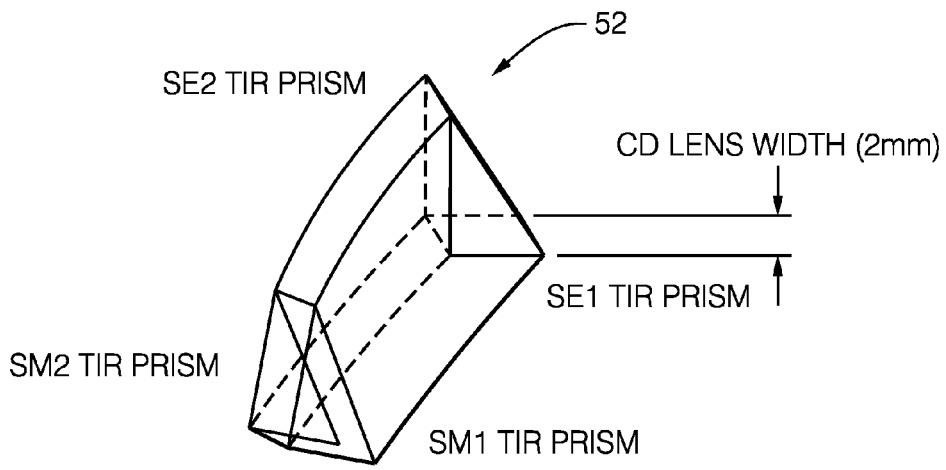
FIG. 5 is a portion of a ring-lens used in the assembly of FIG. 2 in accordance with one embodiment.
Figure 6:
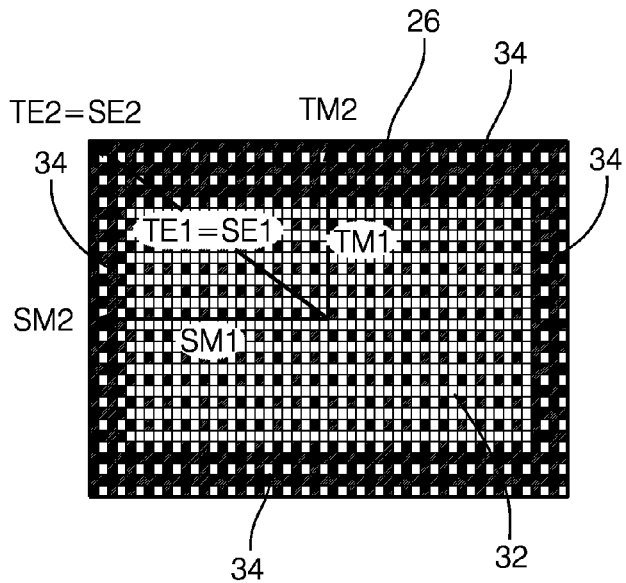
FIG. 6 is a table of design parameters for the ring-lens of the assembly of FIG. 2 in accordance with one embodiment.

FIGS. 4, 5, and 6 illustrate non-limiting details of a possible configuration of the ring-lens 44. In this example, the ring-lens 44 is advantageously formed of a plurality of catadioptric-elements, hereafter the CD element 52 (FIG. 5). The ring-lens 44 configured to direct light from outside and/or inside the field-of-view 14, and direct that light through the main-lens 42 and onto the periphery-portion 34. In this example, the imager-device 26 is assumed to have a 4:3 aspect ratio. Those in the lens making arts will recognize how to adapt the example presented herein to other aspect ratios, 16:9 for example.

FIG. 4 suggests how the ring-lens 44 can be segregated into four zones so that light 54 can be projected or focused onto corresponding sections of the periphery-portion 34 of the imager-device 26. The following is a description of the design process used to design the ring-lens 44 when the CD element 52 is used to direct the light 54 onto the various section of the periphery-portion 34.

Use overscan angular tolerance for the periphery-portion 34 (e.g. +/−3.5° boarder around the imager-device 26). The overscan angular tolerance is the portion of the imager that is outside the required field of view and is typically allocated for mounting and alignment tolerance.

Determine field positions for the main-lens 42 based on the overscan angular tolerance. The main lens field of view is mapped to the imager pixel locations. The pixel locations on the imager are then matched to the overscan tolerance so that the correct peripheral pixels are used. For example, the Sunny 4067 lens yields a 66 degree diagonal field of view (or +/−33 degrees from the center), yields a 52 degree horizontal field of view (or +/−26 degrees from the center) and yields a 39 degree vertical field of view (or +/−19.5 degrees from center). By subtracting 3.5 degrees from the horizontal and vertical fields of view and 5 degrees from the diagonal, the corresponding imager pixel positions represent the border definition of the periphery-portion 34. For the top section, middle (TM1, TM2)—16° to 19.5° field position window, the pixel positions are mapped to the vertical field angular positions. The TM1 corresponds to the 16° position and TM2 corresponds to the 19.5° position. For top section, edge (TE1, TE2)—28.0° to 33° field position window* (TE1=SE1, TE2=SE2), the pixel positions are mapped to the diagonal field angular positions. The TE1 corresponds to the 28° position and TE2 corresponds to the 33° position. At the diagonal corner of the imager, the side and top sections merge together. For the side section, middle (SM1, SM2)—22.5° to 26° field position window, the pixel positions are mapped to the horizontal field angular positions. The SM1 corresponds to the 22.5° position and SM2 corresponds to the 26° position. For side section, edge (SE1, SE2)—28.0° to 33° field position window* (TE1=SE1, TE2=SE2), the SE1 corresponds to the 28° position and SE2 corresponds to the 33° position. At the diagonal corner of the imager, the side and top sections merge together and their angular positions overlap. Only these six design positions are required due to symmetry to opposite edges & sides. The field positions define the angular window for the CD lens to refract the off-axis light. The CD lens is designed to focus off-axis light into the main lens to then focus onto the imager focal plane perimeter.

Determine TIR shapes for light refraction based on middle and end positions (e.g. TM1, TM2, TE1, TE2, SM1, SM2, SE1, SE2). The shape of each TIR section is based on the deflection to prism angle with the deflection angle equal to the angular position (e.g. deflection angle for SM1=22.5 degrees). So, from TIR refraction, the prism angle=64.14 degrees for SM1 if the CD lens were made from an acrylic lens material with a refractive index=1.4915. The prism angle for SM2 (whose deflection angle is=26.0 degrees) =63.53 degrees. For each zone shape, the two TIR prisms are merged (or blended) from edge to middle to edge (e.g. zone 2, SE1-SE2 to SM1-SM2 to SE1-SE2). The compound prism shape (e.g. from SM1 to SM2) are combined across the width so that the prism shape is a continually changing prism angle equally changing between the end positions. To minimize unwanted glare, the deflection angle is equal to the field position (e.g. SM1 deflection angle=22.5 degrees). Each TIR shape is rotated to the initial periphery-portion field angle so that refracted rays enter main lens at the field angle that matches the beginning of the periphery-portion 34 of imager-device 26. For example, for the SM1-SM2 section, the prism shape is rotated 22.5 degrees away from the center.

The TIR compound shape is obtained by blending in a continually changing prism angle equally changing between the two TIR angles over the width of the CD lens (e.g. 2 mm thickness). Per the middle and edge definitions, the TIR compound shapes are merged together from center to edge symmetric about the centerline axis (horizontal and vertical). The lengths of each section are based upon the zone arc sizes and CD lens circumference to main lens. This is repeated for all four zones, and the prism shape is merged (or blended) at the boundary positions proportionately (e.g. the top and bottom sections are 103 degrees each and the middle sections (left and right) are 77 degrees together forming a 360-degree CD lens shape. The CD ring lens is aligned so that it is centered about the main lens optical axis and imager orientation to insure the CD lens refraction of the ring-lens 44 coincides with the main-lens 42 to imager focus.

Accordingly, an integrated camera, ambient light detection, and rain sensor assembly (the assembly 20), and a controller 48 for the assembly 20 are provided. The imager-device 26 has distinct filter configurations for the central-portion 32 and the periphery portion 34 so that the two portions of a single instance of the imager-device 26 can be used for different functions (camera, ambient light detection, and rain sensor). The RVVV and RGBN spectral filter are aligned on a 1:1 filtered pixel to imager sub-pixel basis. That is, for the central RVVV section, there is one red filtered imager sub-pixel and three visible filtered sub-pixels mapped to every imager pixel Likewise with the RGBN peripheral section. A ring-lens 44 formed of a plurality of catadioptric-elements (the CD element 52) is also provided as a CD type ring-lens provides for an expanded area of coverage for rain-sensing and ambient-light-intensity determination.

While this invention has been described in terms of the preferred embodiments thereof, it is not intended to be so limited, but rather only to the extent set forth in the claims that follow.

We claim:

1. An integrated camera, ambient light detection, and rain sensor assembly suitable for installation behind a windshield of a vehicle, said assembly comprising:
    an imager-device formed of an array of pixels configured to define a central-portion and a periphery-portion of the imager-device, wherein each pixel of the array of pixels includes a plurality of sub-pixels, each pixel in the central-portion is equipped with a red/visible/visible/visible filter (RVVV filter) arranged such that each pixel in the central-portion includes a red sub-pixel and three visible-light sub-pixels, and each pixel in the periphery-portion is equipped with a red/green/blue/near-infrared filter (RGBN filter) arranged such that each pixel in the periphery-portion includes a red sub-pixel, a green sub-pixel, a blue sub-pixel, and a near-infrared sub-pixel.

2. The assembly in accordance with claim 1, wherein the assembly further includes
    a main-lens configured to focus light from the field-of-view onto the central-portion; and
    a ring-lens formed of a plurality of catadioptric-elements configured to direct light from outside the field-of-view, through the main-lens, and onto the periphery-portion.

3. The assembly in accordance with claim 1, wherein the assembly further includes
    a controller in communication with the imager-device and configured to
    determine an image of a field-of-view forward of the vehicle based on light detected by the red sub-pixel and the three visible-light sub-pixels of pixels in the central-portion,
    determine an ambient-light-intensity based on light detected by the red sub-pixel, the green sub-pixel, and the blue sub-pixel of pixels in the periphery-portion, and
    determine a presence of water on the windshield based on light detected by the near-infrared sub-pixel of pixels in the periphery-portion.

4. The assembly in accordance with claim 3, wherein the controller is configured to
    determine which pixels of the periphery-portion correspond to an enduring-obstruction on the windshield, and ignore those pixels when the controller determines the presence of water.

5. The assembly in accordance with claim 3, wherein the controller is configured to
    determine which pixels of the central-portion detect red-taillights of an other-vehicle based on a comparison of light-intensity indicated by the red-subpixel to light-intensity indicated the three visible-light sub-pixels of a selected pixel.

* * * * *